J. H. K. KIRNER.
DIVIDED BALL AND ROLLER BEARING.
APPLICATION FILED OCT. 26, 1911.
1,145,999.
Patented July 13, 1915.
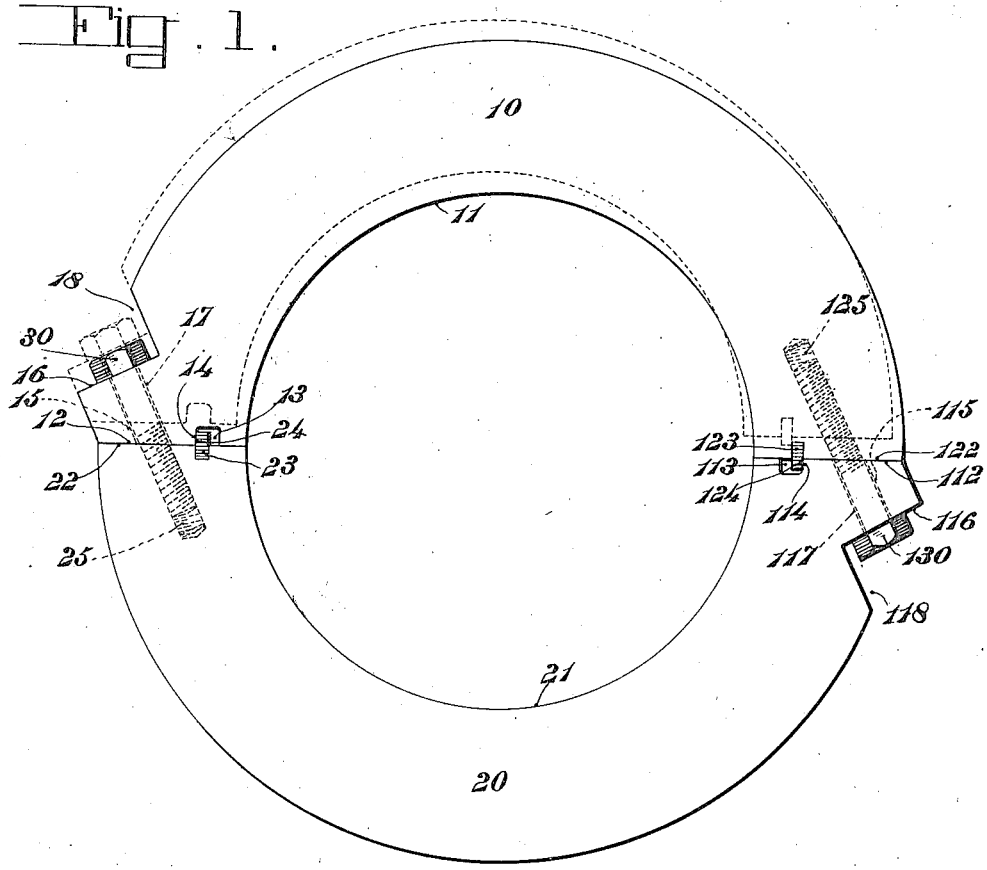
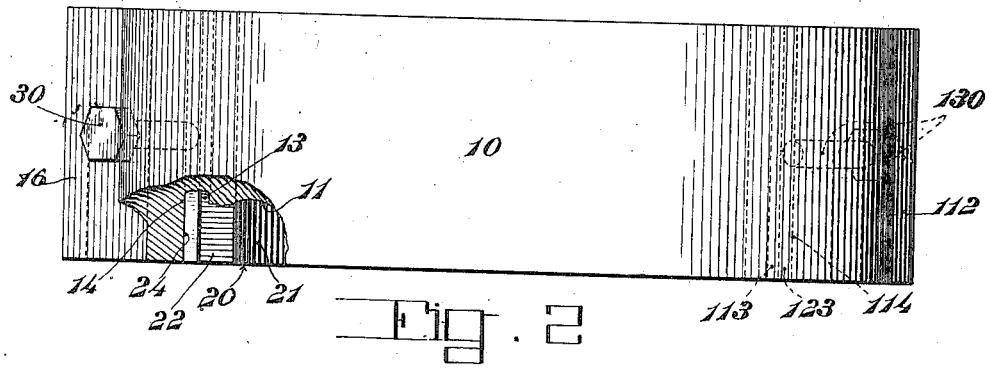

UNITED STATES PATENT OFFICE.

JOSEF HERMANN KARL KIRNER, OF STUTTGART, GERMANY, ASSIGNOR TO NORMA COMPAGNIE G. M. B. H., OF CANNSTATT-STUTTGART, GERMANY, A CORPORATION OF GERMANY.

DIVIDED BALL AND ROLLER BEARING.

1,145,999.  Specification of Letters Patent.  Patented July 13, 1915.

Application filed October 26, 1911.  Serial No. 656,830.

*To all whom it may concern:*

Be it known that I, JOSEF HERMANN KARL KIRNER, a citizen of the Empire of Germany, and a resident of Stuttgart, in the Kingdom of Wurttemberg, in the Empire of Germany, have invented certain new and useful Improvements in Divided Ball and Roller Bearings, of which the following is a specification.

This invention has for its object to provide an improved means of connecting together parts of the divided ball and roller bearings.

Hitherto the use of divided ball or roller bearings has had the disadvantage that when the two halves of an annular race for such bearings were connected, a projection or irregularity almost always resulted at the joint, interrupting the running surface, which had a highly deleterious action on the race by reason of the high surface pressure peculiar to such bearings. The formation of such an interruption of the race cannot be avoided by the finishing of the race in the ordinary way, as there is generally no security that when the parts are taken apart the separate parts on being put together will come into exactly the same positions relative to one another as before, because a certain displacement of the parts is always possible. The efforts previously made had for their object to keep as small as possible this disadvantage which was regarded as unavoidable and to form the joint faces in such a way, as for instance, to provide them with holding pins and so forth, arranged that it should only be possible to put them together when the parts were each time in exactly the same positions relative to one another. This invention departs from these efforts, and on the contrary allows for the possibility of displacement of the separate parts, whereby articles may be produced on a practical manufacturing scale. The possible displacement is, however, produced after being put together or during the putting together of the half races and is as large as is possible. Consequently in any subsequent putting together the parts relative to one another must always exactly assume the same positions, if only care be taken that the possible displacement be each time carried as far as possible.

Figure 1 of the accompanying drawings shows an end elevation of a sectional roller bearing embodying one form of this invention, in which said bearing is composed of two similar semi-sections. Fig. 2 represents a top plan view thereof, parts being broken out to facilitate illustration.

The same reference numbers indicate corresponding parts in both figures.

The roller bearing illustrated in the accompanying drawings as one example of this invention, comprises two semi-sections 10 and 20 having arc-shaped bearing faces 11 and 21 constituting parts of the raceway for the rollers. The meeting edges of these semi-sections have interlocking connections which admit of a limited lateral displacement of the sections, such interlocking connections being so arranged that when the sections are at one extremity of lateral displacement, the race faces are exactly in register and form a continuous smooth bearing. In the illustrated embodiment of this interlocking connection one of the sections as 10 is provided on its meeting face 12 with a hole or recess 13 and on its other diametrically opposite meeting face 122 with a projection or rib 123 embedded in said face. The other section as 20 is provided on its meeting face 22 with a projection or rib 23 embedded in said face and on its meeting face 112 with a hole or recess 113. When the sections 10 and 20 are placed together, the projections 23 and 123 extend into the slots or recesses 13 and 113 respectively. The projections or ribs 23 or 123 are smaller than the recesses 13 and 113 so as to permit more or less lateral play between the sections. When the outer face 14 of the recess 13 abuts against the outer face 24 of the rib 23 and the outer face 114 of the recess 113 abuts against the outer face 124 of the rib 123, the race faces 11 and 21 of the two semi-sections are exactly in register.

Means are provided for locking the sections in their normal adjustment. Any suitable means may be employed for this purpose. The means shown consist of an inclined screw bolt 30 which is passed loosely through a hole 17 in the lip 16 of the section 10 and which takes into an inclined threaded socket 25 in the section 20, said bolt passing at an incline across the joint between the faces 12 and 22 of said sections and having its head resting on the face of the lip 16 in an angular recess 18 formed in the periphery of the section 10. A corresponding bolt 130 passes loosely through the inclined hole 117 in the lip 116 of the section 20 and takes into an inclined threaded socket 125 in the section 10, said bolt passing at an incline across the joint between the faces 112 and 122 of said sections and having its head resting on the face of the lip 116 in the angular recess 118 formed in the periphery of the section 10.

In the use of this invention, the sections being apart, as indicated in dotted lines in Fig. 1, the section 10 is brought down into contact with section 20, the contact faces 12 and 122 of the section 10 being in touch with the contact faces 22 and 112 of the section 20 and the projection 23 of the section 20 entering the recess 13 of the section 10 and the projection 123 of the section 10 entering the recess 113 of the section 20. The parts are then probably in such relative position as to cause the race faces 11 and 21 to break joint. Then the section 10 is pushed toward the right until the outer face 14 of the recess 13 abuts against the outer face 24 of the projection 23 and the outer face 124 of the projection 123 abuts against the outer face 114 of the slot 113. When these slots and projections are brought to a stop by such contact, the relation of the parts is such that there is an absolute continuity of the race faces 11 and 21 of the two sections. Then the locking bolts 30 and 130 are screwed into position and the parts are tightly pressed and locked together as indicated in full lines in Fig. 1. In the making of these roller bearings, the race faces 11 and 21 of the respective sections are ground while the parts are thus locked together and ever after when this adjustment is effected between the parts, the race faces will form a continuous circuit.

It is therefore no longer a question of fitting the parts to one another with absolute accuracy but only of setting a certain limit to the displacement of the parts relatively to one another, it is easily evident that the fitting surfaces of the parts, the holding pins, etc., may be made much more simply when this invention is employed and therefore a greater exactness in the connection obtained than hitherto. At the same time a feature is encountered to which hitherto sufficient attention has not been paid. The projection or irregularity in the race is caused not only in consequence of unavoidable inexactitudes in making the bearing, but also in the case of exactly finished races, in consequence of the pressure of the balls or rollers. When a ball or roller is traveling over the joint, the ends of the half are depressed in similar manner to that which has been observed at the joints of railway rails. This depression at the joint is also rendered impossible according to this invention by all possible movement being compulsorily obtained before the races are finished. The invention consists therefore in finishing the joints of the running surfaces before assembling them for use, in such a manner as to take up any relative movement due to pressure exerted thereon during use, whereby a smooth joint during use is obtained.

Having thus described my invention, I claim as new and desire to secure by Letters Patent:

A sectional roller bearing race composed of race sections having an interlocking connection on their meeting faces, said connection admitting of a limited lateral displacement of said sections, and consisting of a stop on one face and a recess on the other face larger than the stop, the race faces being in register when the sections are at one extremity of their lateral adjustment, and means for holding the sections in such adjustment.

In testimony, that I claim the foregoing as my invention, I have signed my name in presence of two subscribing witnesses.

JOSEF HERMANN KARL KIRNER

Witnesses:
 MAX SCHWEIKERT,
 CARL RUPP.

Copies of this patent may be obtained for five cents each, by addressing the "Commissioner of Patents, Washington, D. C."